(12) United States Patent
Gobriel et al.

(10) Patent No.: US 8,307,234 B2
(45) Date of Patent: Nov. 6, 2012

(54) MAINTAINING CONNECTIVITY DURING LOW POWER OPERATION

(75) Inventors: Sameh Gobriel, Hillsboro, OR (US); Christian Maciocco, Portland, OR (US); Kristoffer D. Fleming, Chandler, AZ (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/350,760

(22) Filed: Jan. 14, 2012

(65) Prior Publication Data

US 2012/0117401 A1 May 10, 2012

(51) Int. Cl.
- G06F 1/00 (2006.01)
- G06F 1/26 (2006.01)
- G06F 15/177 (2006.01)
- G06F 15/173 (2006.01)
- G06F 15/16 (2006.01)
- H04L 9/32 (2006.01)
- H04L 12/66 (2006.01)
- H04L 7/00 (2006.01)
- G08C 17/00 (2006.01)
- H04M 1/00 (2006.01)

(52) U.S. Cl. ........ 713/323; 713/171; 713/320; 713/324; 370/311; 370/352; 375/354; 455/574; 709/220; 709/223; 709/227

(58) Field of Classification Search ............... 713/171, 713/320, 323, 324; 370/311, 352; 375/354; 455/574; 709/220, 223, 227
See application file for complete search history.

(56) References Cited

U.S. PATENT DOCUMENTS

| | | | |
|---|---|---|---|
| 2009/0205038 A1* | 8/2009 | Kumar et al. | 726/11 |
| 2010/0039971 A1* | 2/2010 | Lor et al. | 370/311 |
| 2010/0058082 A1* | 3/2010 | Locker et al. | 713/320 |
| 2010/0069127 A1* | 3/2010 | Fiennes | 455/574 |
| 2010/0174808 A1* | 7/2010 | Dabagh et al. | 709/221 |

* cited by examiner

*Primary Examiner* — Stefan Stoynov
(74) *Attorney, Agent, or Firm* — Grossman, Tucker, Perreault & Pfleger, PLLC (57) ABSTRACT

Generally this disclosure describes methods and systems for conserving energy in a client platform by maintaining connectivity between the client platform and a remote resource when the client is in a low-power state. An example method may include receiving notification that the client platform is transitioning to the low-power state, receiving at least one payload from the client platform, the at least one payload being configured to maintain connectivity with a remote resource while the client platform is in the low-power state, transmitting a packet including the at least one payload and receiving a packet including an acknowledgement.

14 Claims, 9 Drawing Sheets

MAINTAINING CONNECTIVITY DURING LOW POWER OPERATION

CROSS-REFERENCE TO RELATED APPLICATIONS

This application is related to U.S. patent application Ser. No. 13/175,757 filed Jul. 1, 2011, which is related to U.S. patent application Ser. No. 13/175,778 filed Jul. 1, 2011, which is related to U.S. patent application Ser. No. 13/341,064 filed Dec. 30, 2011, the disclosures of which are incorporated in their entirety herein by reference.

FIELD

The present disclosure relates to wireless and/or wired communications, and more particularly, to energy efficient communication provided while a client platform is in low power state.

BACKGROUND

To reduce power consumption (and extend battery life), portable wireless devices (such as, but not limited to, laptops, netbooks, tablet computers, and the like) may toggle between an active-power state (for example the S0 state according to the Advanced Configuration and Power Interface (ACPI) specification) and a low-power state (also known as a standby mode, sleep mode, suspend mode, or the like). When switched to the low-power state (also known as S3 mode according to the ACPI specification), power consumption is reduced by reducing and/or eliminating power to all unneeded portions of the platform and devices. In many situations it is desirable for one or more applications/services executing on the portable wireless device to maintain connectivity and presence so that the platform or end-user can always be reached.

One approach to maintain connection and presence with an application server involves periodically transitioning the platform from the standby mode to the active mode so that the platform may transmit presence data to the application server and/or receive any other data. Unfortunately, this approach requires a significant amount of energy as the entire platform is toggled between standby and active modes. Additionally, the periodic toggling between standby and active modes may have a negative impact on reliability of the standby-to-active transition. While technologies such as Wake on Wireless LAN (WoWLAN) have low power consumption, WoWLAN only maintains the data link (L2 link layer) connectivity to the local access point. As such, WoWLAN cannot maintain connectivity and presence to an application server.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an energy-efficient wireless or wired communications approach that enables a platform and applications/services (e.g., Always-On-Always-Connected (AOAC) applications) to maintain connectivity and presence to a network and remote application servers while the platform is, and stays in, a low-power state. In at least one embodiment described herein, AOAC applications/services desiring to maintain connectivity and presence to the network and remote application servers initiate the building of a list of keep-alive messages before the platform transitions into a low-power state (e.g., from an active power state) to reduce power consumption (e.g., to preserve battery life). The keep-alive messages (which may include a respective application/service proprietary protocol, sequence number, timing information, and/or application/service key or token) are periodically transmitted by a communication device (e.g., a wireless or wired Network Interface Circuitry (NIC) and/or an integrated wireless/wired controller) of the platform to the appropriate address after the platform transitions into the low-power state. As the communication device of the platform is able to issue the keep-alive messages while the platform remains in the low-power state, connectivity and presence to the network and/or remote application servers is maintained in an energy efficient manner.

As used herein, the term "active power state" refers to a platform functioning in a working or fully operational state. An example of an active power state includes the S0 state as defined by the Advanced Configuration and Power Interface (ACPI) specification. Another example includes, but is not limited to, the Full On power state. As used herein, the term "low-power state" refers to a platform functioning in a reduced power state in which power to devices that do not indicate they must remain on may be powered down and one or more central processing units (CPUs) stop executing instructions (e.g., are powered down). Examples of low-power power states include the S1, S2, S3, and/or S4 states as defined by the ACPI specification. Further examples of low-power states are also known as a standby mode, sleep mode, suspend mode, or the like.

In one embodiment, connectivity may be maintained to a remote resource (e.g., at least one remote application server) while conserving energy in the platform by the NIC transmitting messages (e.g., packets) to the at least one remote application server when the platform is in a low-power state. For example, AOAC applications/services residing on both the platform and the remote application server may interact (e.g., exchange keys) in order to establish a shared private key between the devices. The shared private key may be employed in encrypting payloads for transmission by the NIC when the platform is in the low-power state. For example, the AOAC applications/services on the platform may generate the encrypted payloads and forward them to a memory accessible to the NIC when the platform transitions to a low-power state. After initiating a network connection with the remote application server (e.g., such as a Transmission Control Protocol (TCP) connection), the NIC may be configured to transmit "keep-alive" packets on a set interval, wherein each packet includes an encrypted payload. An acknowledgement may then be received by the NIC if the payload is determined to be acceptable by the remote application server. Upon receiving the acknowledgement packet, the NIC may transmit a packet containing the next payload. Payload transmission, followed by acknowledgement reception, may continue until all the payloads in the memory are transmitted. The NIC may then cause the platform to transition from the low-power state to an active power state to resume regular platform operation, to generate more payloads for AOAC operation, etc.

In the same or another embodiment, other situations may also exist where the NIC may be configured to cause the platform to transition from the low-power state to the active power state. For example, the NIC may continue to retransmit a packet including a payload until an acknowledgement is received from the remote application server or until a retransmission limit is reached. The NIC reaching the retransmission limit may indicate that there is a problem with the AOAC operations, and thus, the NIC may cause the platform to transition from the low-power state to the active power state to handle the problem. The remote application server may also cause the platform to transition from the low-power state to the active power state. For example, the remote application server may be configured to transmit a message to the NIC when it has information to transmit for the platform. Upon receiving a packet from the remote application server indicating that information is pending for transmission, the NIC may cause the platform to transition from the low-power state to the active power state to receive the information.

Figure 1:
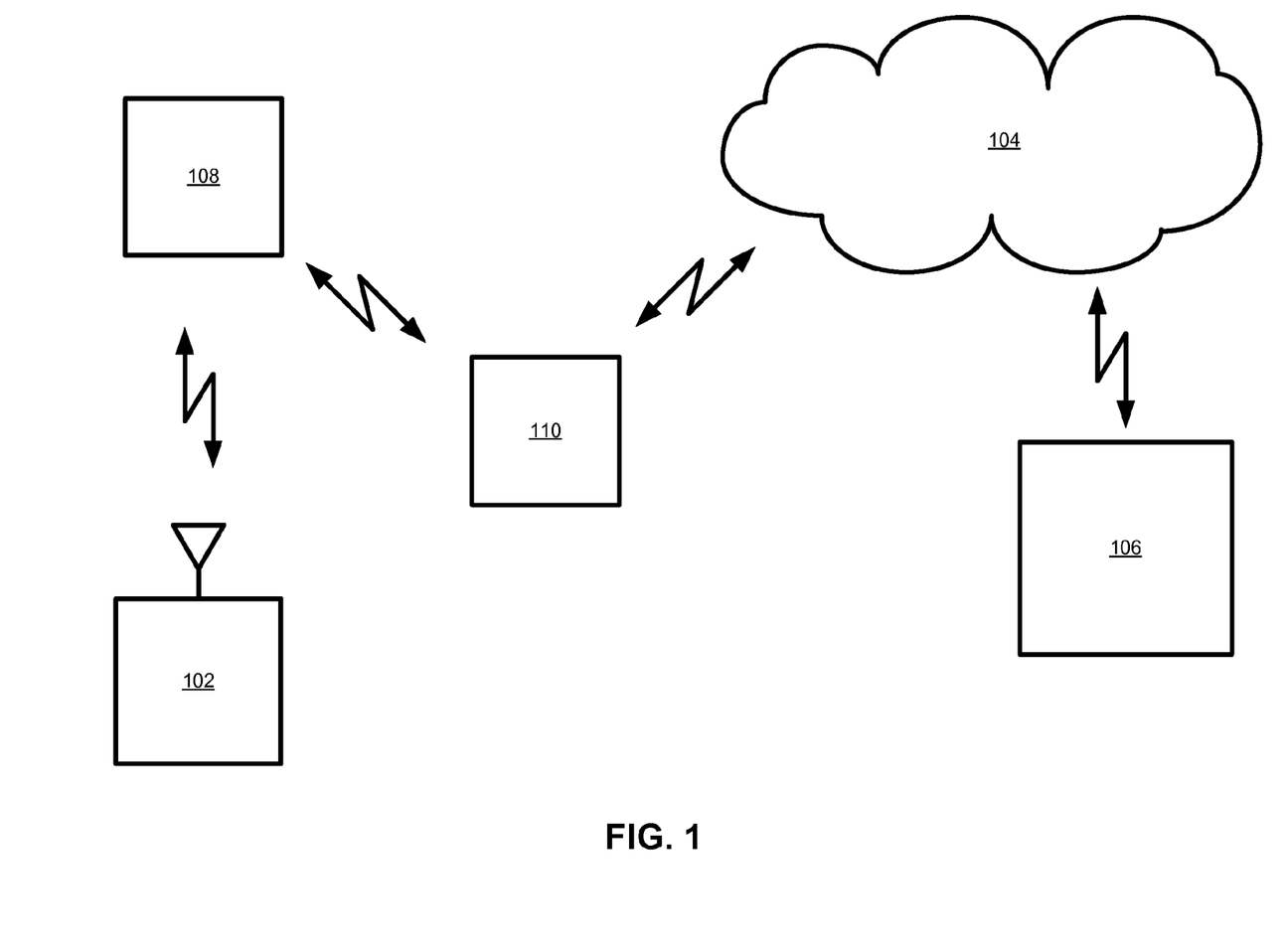
FIG. 1 illustrates one embodiment of a communication system between a client platform and a remote application server consistent with the present disclosure.

Turning now to FIG. 1, one embodiment of a communication system 100 is generally illustrated. The communication system 100 includes one or more client platforms 102 configured to establish a wireless and/or wired communication link across the network 104 with one or more remote application servers 106. The client platform 102 may include a desktop, a laptop, and/or a mobile computing device. Examples of mobile computing devices include, but are not limited to, a smart phone (such as, but not limited to, a Blackberry™ smart phone, an iPhone™ smart phone, an Android™ smart phone, and the like), a tablet computer (such as, but not limited to, an iPad™ tablet computer, PC-based tablet computers, and/or current or future tablet computers offered by Intel™ Corporation), and ultra-mobile personal computers.

The client platform 102 may be configured to establish a communication link with one or more network access points/bridges 108 and/or other communication devices 110 (such as, but not limited to, Network Address Translation (NAT) devices) in the communication pathway/link between the client platform 102 and the remote application server 106. For example, the client platform 102 can use signals to communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e, 802.11 ah standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

Figure 2:
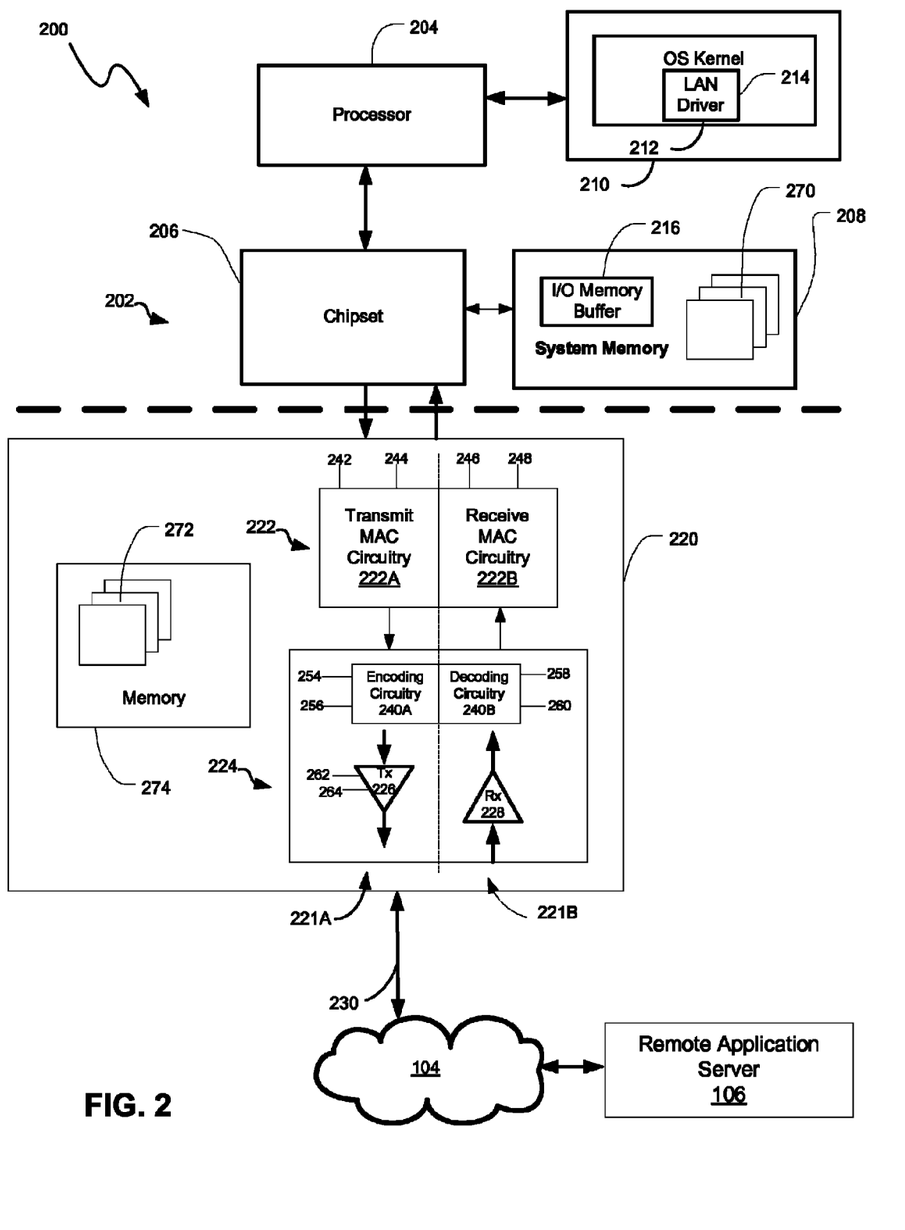
FIG. 2 illustrates one embodiment of a client platform consistent with the present disclosure.

Turning now to FIG. 2, one embodiment of the client platform 200 consistent with the present disclosure is generally illustrated. The client platform 200 includes a host system 202 and a NIC 220. The host system 202 may include a host processor 204, chipset circuitry 206 and system memory 208. The host processor 204 may include one or more processor cores and may be configured to execute system software 210. System software 210 may include, for example, operating system code 212 (e.g., OS kernel code) and wireless and/or wired driver code 214 (such as, but not limited to, a local area network (LAN)). LAN driver code 214 may be configured to control, at least in part, the operation of the NIC 220 operation, as will be described in greater detail below. System memory 208 may include I/O memory buffers 216 configured to store one or more data packets that are to be transmitted by, or received by, NIC 220. Chipset circuitry 206 may generally include "North Bridge" circuitry (not shown) to control communication between the processor 204, NIC 220 and system memory 208. Also, chipset circuitry 206 may include circuitry (not shown) to control I/O communications between the host system 202 and the NIC 220.

NIC 220 may be logically and/or physically divided into a transmit path 221A and a receive path 221B. The NIC 220 may generally include Ethernet media access control (MAC) circuitry 222 and physical interface (PHY) circuitry 224. MAC circuitry 222 may include transmit MAC circuitry 222A configured to assemble data to be transmitted into frames, or packets, that include destination and source addresses along with network control information and error detection hash values. MAC circuitry 222 may also include receive MAC circuitry 222B configured to remove data from received frames and place the data in system memory 208.

PHY circuitry 224 may include encoding circuitry 240A configured to encode data packets and decoding circuitry 240B configured to decode data packets. Encoding circuitry 240A and decoding circuitry 240B may collectively be embodied as a processor (for example, a digital signal processor) configured to perform analog-to-digital and digital-to-analog conversion, encoding and decoding of data, analog parasitic cancellation (for example, cross talk cancellation), and recovery of received data. PHY circuitry 224 may also include transmit (Tx) circuitry 226 configured to transmit one or more data packets and receive (Rx) circuitry 228 configured to receive one or more data packets. Rx circuitry 228 may include phase lock loop circuitry (PLL, not shown) configured to coordinate timing of data reception. The PHY circuitry 224 may be configured to establish an Ethernet communications link 230 for transmitting and receiving data (e.g., packets) either wirelessly and/or over a media dependent interface (which may include, for example Category 6 (Cat6) Ethernet cable).

Transmit MAC circuitry 222A may include a controllable clock input 242 and a controllable power input 244. Clock input 242 may generally include a clock signal that controls the clocking of the MAC circuitry 222A. Power input 244 may generally include a power supply signal to supply power to one or more components of the MAC circuitry 222A. Similarly, Receive MAC circuitry 222B may include a controllable clock input 246 and a controllable power input 248. Clock input 246 may generally include a clock signal that controls the clocking of the MAC circuitry 222B. Power input 248 may generally include a power supply signal to supply power to one or more components of the MAC circuitry 222B. Encoding circuitry 240A may include a controllable clock input 254 and a controllable power input 256, and decoding circuitry 240B may include a controllable clock input 258 and a controllable power input 260. Transmit circuitry 226 may include a controllable clock input 262 and a controllable power input 264. In one embodiment, clocking of the transmit path 221A and receive path 221B may be independently controlled. Also, in one embodiment, the power of transmit path 221A and receive path 221B may be independently controlled.

The NIC 220 may be configured to exchange commands and data with a remote application servers 106, via one or access points/bridges (which may include a switch, bridge, router and/or other NIC which may be associated with a host system similar to host system 202, not shown in FIG. 2) and/or remote application server 106. Remote application server 106 may include any device that is configured to communicate with the NIC 220 using a wireless or wired communications protocol to maintain an AOAC application executing on client platform 200.

Although other power states are also possible, the client platform 200 is configured to operate in at least an active power state mode and a low-power state. In the active-power state, the host system 202 and the NIC 220 are generally fully functional. When the client platform 200 is operating in the low-power state, power may generally be turned off to the host system 202, and just the NIC 220 may remain functional.

Prior to switching from a first power state (e.g., the active power state or an intermediary or secondary-power state between the active power state and the low-power state as described herein) to the low-power state, the client platform 200 is configured to initiate the building of a list or set of keep-alive messages 272 for one or more AOAC applications/services 270 (e.g., applications 270 stored in memory 208) executing on the host system 202 that desire to maintain connectivity and presence to the network and application servers. For example, the AOAC applications/services 270 may initiate the building of the keep-alive messages 272 immediately prior to the client platform 200 transitioning to the low-power state, for example, upon activation of a function key or any other means such as, but not limited to, a predefined timeout period. The keep-alive messages 272 are configured to maintain connectivity and presence with the remote application servers. For example, the keep-alive messages 272 may be configured to maintain the L2 connectivity (for example, to support WoWLAN). The offloaded protocols may also be configured to maintain the platform L3 (IP) address (e.g., Address Resolution Protocol (ARP), Dynamic Host Configuration Protocol (DHCP) leases, and Internet Control Message Protocol (ICMP)).

The specific format of each of the keep-alive messages 272 will therefore depend on the specific AOAC application as well as the transmission protocols used to communicate between the client platform 200 and the remote application servers. For example, the keep-alive messages 272 may be generated based on a respective AOAC application/service proprietary protocol and may include appropriate sequencing information and timing (if required) and may be secured with the application/service key/tokens (if required).

The set of keep-alive messages 272 (or at least a portion thereof) may be stored in memory 274. Memory 274 may be located anywhere on the client platform 200 that is accessible by the NIC 220 while the client platform 200 is (and remains) in the low-power state. For example, memory 274 may be part of the NIC 220; however, this is only an example and the memory 274 storing the set of keep-alive messages 272 may be located anywhere in the client platform 200.

Once the client platform 200 transitions into the low-power state, the NIC 220 may be configured to periodically transmit at least one data packet to the remote application server 106 containing a keep-alive message 272. For example, according to one embodiment, the transmit MAC circuitry 222A is configured to receive an AOAC command from a device driver operating on the host system 202. In response to the AOAC command, the transmit MAC circuitry 222A and at least the Tx circuitry 226 are configured to periodically transmit data packets including the keep-alive messages 272 to the remote application server 106. The keep-alive message 272 may be periodically transmitted based on one or more clock signals/inputs 242, 246, 254, 258, and/or 262 associated with the NIC 220. The frequency in which the keep-alive messages 272 may be transmitted by the NIC 220 may be the same or different for each of a plurality of AOAC applications 270. Additionally, the frequency in which the NIC 220 transmits the keep-alive messages 270 may be constant or may change over time.

For example, when there are multiple AOAC applications 270 on the client platform 200, the client platform 200 (e.g., but not limited to, the NIC 220) may determine the minimum time or frequency ($T_{app}$) required for each AOAC application 270 in order to maintain connectivity and presence with the remote servers. The client platform 200 may then compare each of the minimum times $T_{app}$ to determine the smallest $T_{app}$ of all of the AOAC application 270 (i.e., $T_{min}$). The NIC 220 may then transmit the keep-alive messages 272 for all of the AOAC applications 270 based on $T_{min}$. Transmitting the keep-alive messages 272 based on $T_{min}$ for all of the AOAC applications 270 may further reduce power consumption of the client platform 200 while in the low-power state. In particular, the NIC 220 generally consumes more power while transmitting packets than when not transmitting. As such, transmitting the keep-alive messages 272 based on $T_{min}$ for all of the AOAC applications 270 may further reduce power consumption of the client platform 200 by allowing the NIC 220 to transmit multiple keep-alive messages 272 during a single time period and therefore minimizing the amount of time that the NIC 220 spends transmitting packets.

When all of the keep-alive messages 272 in the memory 274 have been transmitted by the NIC 220, the NIC 220 maybe configured to transition the client platform 200 from the low-power state to the active power state (or an intermediary power state between the low-power state and the active-power state) to generate additional keep-alive messages 272 in memory 274. Once the memory 274 has been replenished with additional keep-alive messages 272, the client platform 200 may transition back to the low-power state and the NIC 220 may resume periodically transmitting the keep-alive messages 272 as described herein.

According to another embodiment, the client platform 200 may reduce the storage required to maintain connectivity and presence while client platform 200 is in the low-power state. In particular, the client platform 200 may be configured to generate a general keep-alive message with a list of security tokens for a predefined period of time. The general keep-alive messages and the list of security tokens may then be transferred to the NIC 220 before the client platform 200 transitions in the low-power state. Additionally, information about each keep-alive message (such as the minimum required periodicity to maintain presence/connectivity, the destination address for the keep-alive message, etc.) may also be transferred to the NIC 220. Upon transitioning to the low-power state, the NIC 220 may recover the general keep-alive messages and the list of security tokens, and update the pre-built general keep-alive messages with the security token from the list and sequencing information (along with the destination address). The NIC 220 may then transmit the keep-alive message 272 at the appropriate time intervals to maintain the application/service presence to the network in a secure fashion as to preserve itself against various attacks. Accordingly, the amount of storage required may be reduced since the general keep-alive message and the list of security tokens is generally much smaller than the list of completely pre-built keep-alive messages 272. By way of example, storing ten fully pre-build keep-alive messages of 200 bytes each would require 2000 bytes of storage while using a general keep-alive message of 200 bytes and a list of security token for each message to be generated would require less than 400 bytes for example.

The client platform 200 (e.g., the NIC 220) may also be configured to support more extensive wake patterns than the one defined for WoWLAN. For example, the NIC 220 may be configured to wake up all or a portion of the client platform 200 upon receiving an incoming internet packet, for example, from specific internet based applications such as applications/ services executing on one or more remote application servers. Examples of wake patterns may include, but are not limited to, a TCP (Transport Control Protocol) SYN message, an HTTP or HTTPS message, or any application specific message.

The NIC 220 may also be configured to optionally receive at least one data packet from the remote application servers 106. In one embodiment, to transition into the low-power state from the active data transmission power state, the NIC 220 may be configured to control the clock input 242, 254 and/or 262. For example, the NIC 220 may be configured to control the clock input 246 and/or 258 and the clock inputs 242, 254, 262, 246 and/or 258 may be gated (clock gating) to turn the clock signal OFF to the corresponding circuitry.

Figure 3:
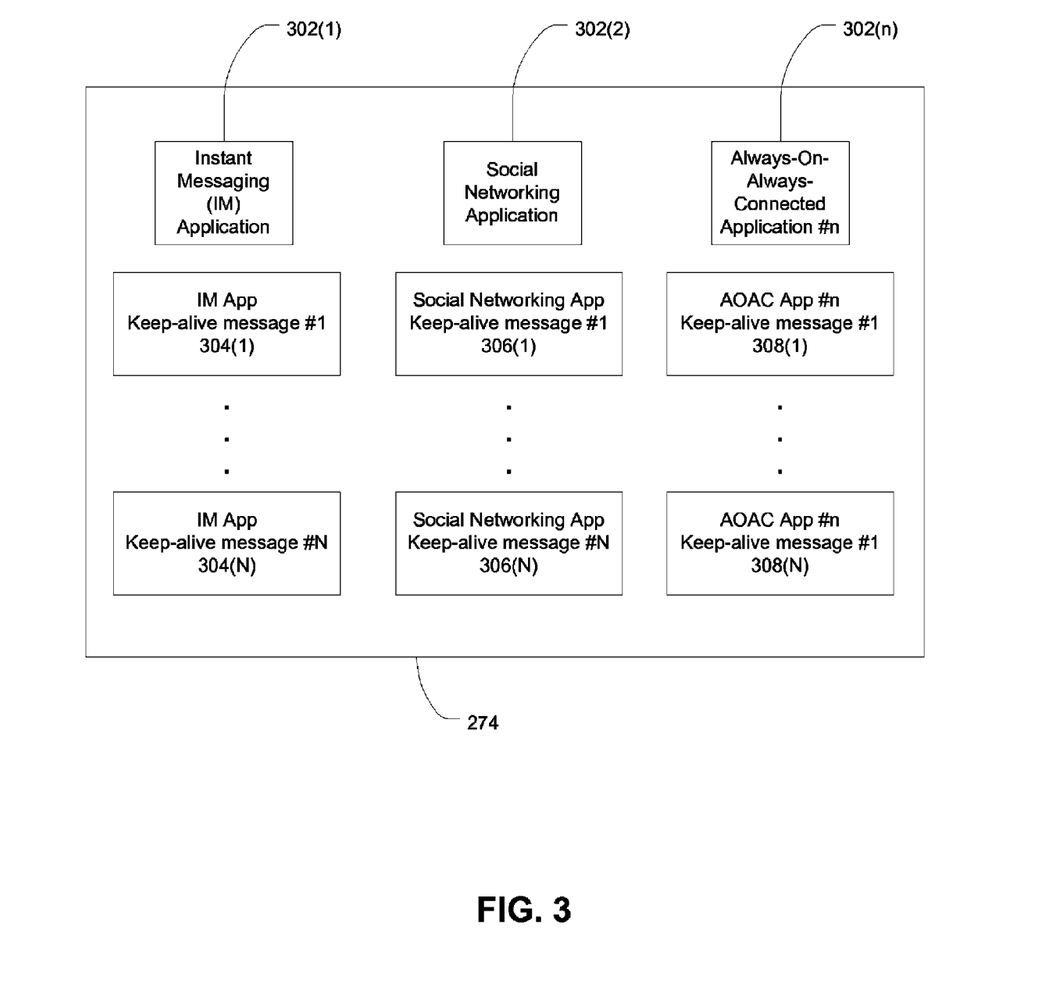
FIG. 3 depicts one embodiment of a list of keep-alive messages stored in memory consistent with the present disclosure.
Figure 4:
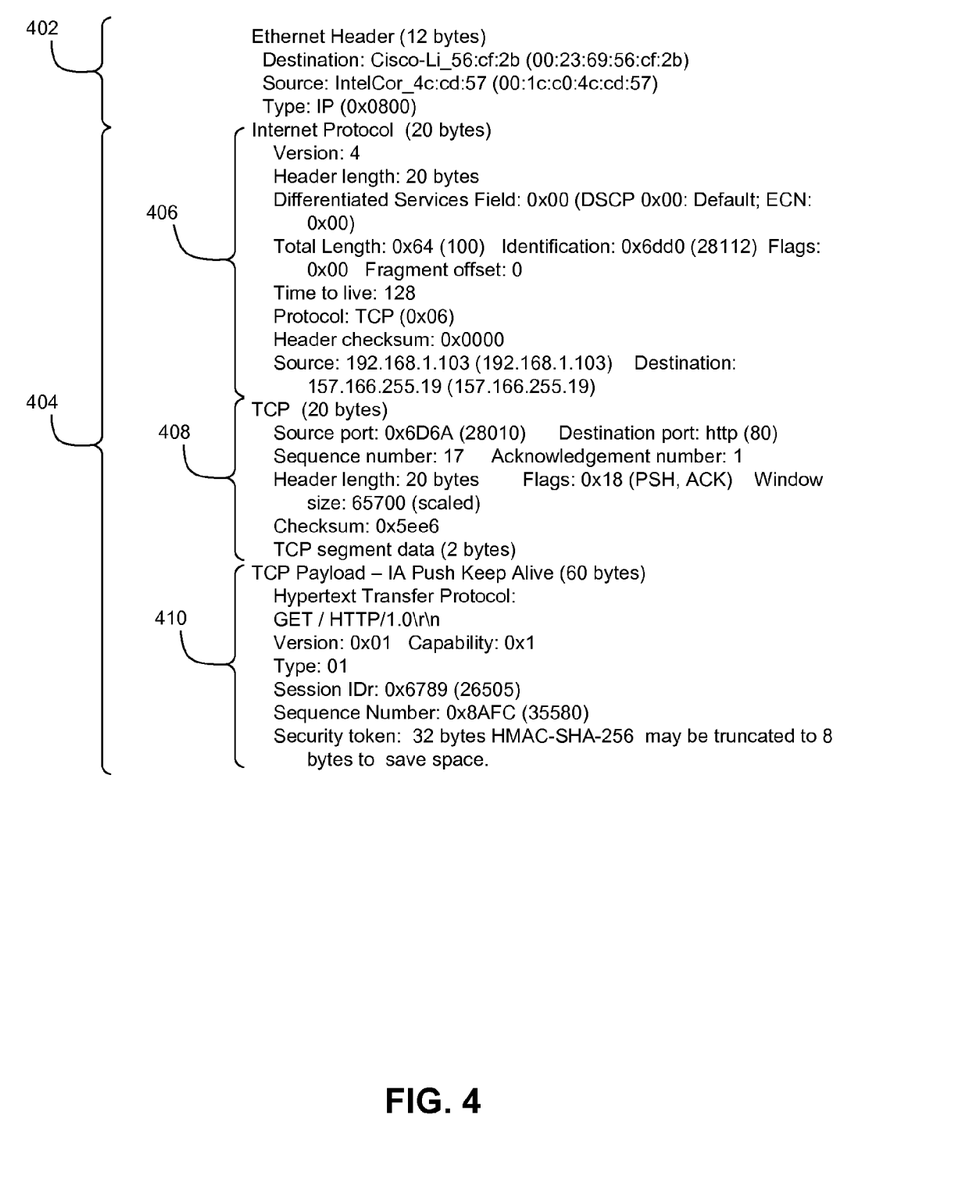
FIG. 4 depicts one embodiment of a keep-alive message packet consistent with the present disclosure.

One embodiment illustrating a list 300 of a plurality of keep-alive messages stored in memory 274 for a plurality of AOAC applications 302(1)-(n), is generally illustrated in FIG. 3. For example, AOAC applications 302(1)-(n) may include an instant messaging (IM) application 302(1) (such as, but not limited to, Microsoft Instant Messaging™, AOL Instant Messenger™, Mobile Instant Messaging (MIM), or the like), a social networking application 302(2) (such as, but not limited to, Facebook™, Twitter™, MySpace™, or the like), and/or any other AOAC application 302(n). Each AOAC application 302(1)-(n) may include a plurality of associated keep-alive messages 304(1)-(N), 306(1)-(N), and 308(1)-(N) based on a respective application/service proprietary protocol, sequence number, timing information, and/or application/service key or token. One embodiment of a keep-alive packet 400 consistent with the present disclosure is generally illustrated in FIG. 4. For example, the keep-alive packet 400 may comprise a header 402 and a payload 404 compatible with a TCP/IP based protocol. The header 402 may contain destination and source MAC addresses. The payload 404 may contain Internet Protocol header segment 406, a TCP segment 408, and a TCP payload segment 410 as generally illustrated.

Figure 5:
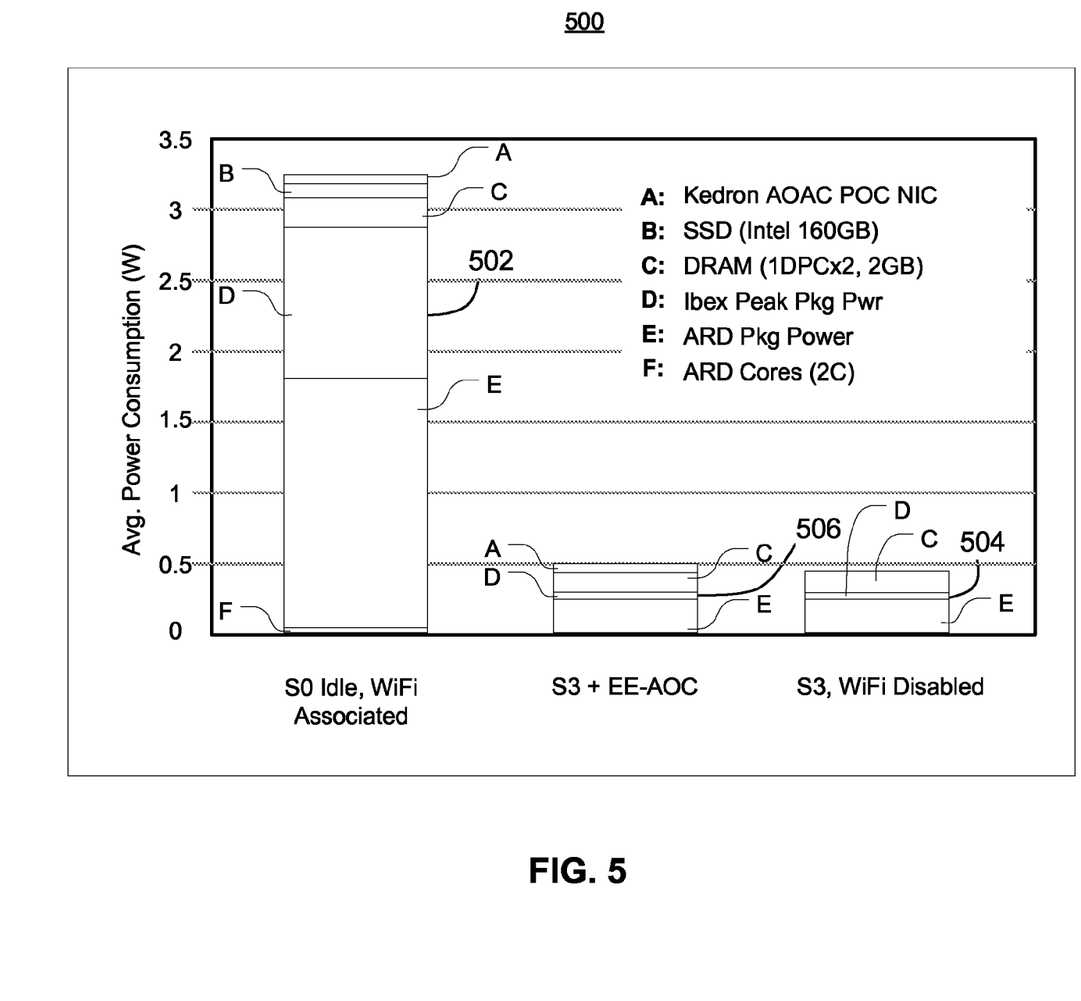
FIG. 5 depicts a power profile chart illustrating the average power consumption of a host system operating in various states.

Turning now to FIG. 5, a chart 500 is provided which illustrates one example of the average power consumption (W) of a client platform in various modes (e.g., modes 502, 504, and 506). As can be seen, the client platform and NIC (e.g., the NIC 220 in FIG. 2) consumes approximately 3.25 W while operating in the active-power state (e.g., S0 Idle) with WiFi active (502) and consumes approximately 0.4 W while in the low-power state (e.g., S3) with WiFi disabled (504). As may be appreciated, the S3 state (504) has the WiFi disabled and therefore cannot maintain network connectivity and/or presence. The S3 state (504) is believed to represent the minimum power that the NIC 220 can consume without the platform being shut down completely. In contrast, the NIC 220 operating in the low-power state (e.g., S3) utilizing the AOAC method of the present disclosure only consumes approximately 0.5 W (506). As such, the NIC 220 in the AOAC mode (506) of the present disclosure only consumes approximately 0.1 W more than the S3 mode (504), while still maintaining network connectivity and presence.

Figure 6:
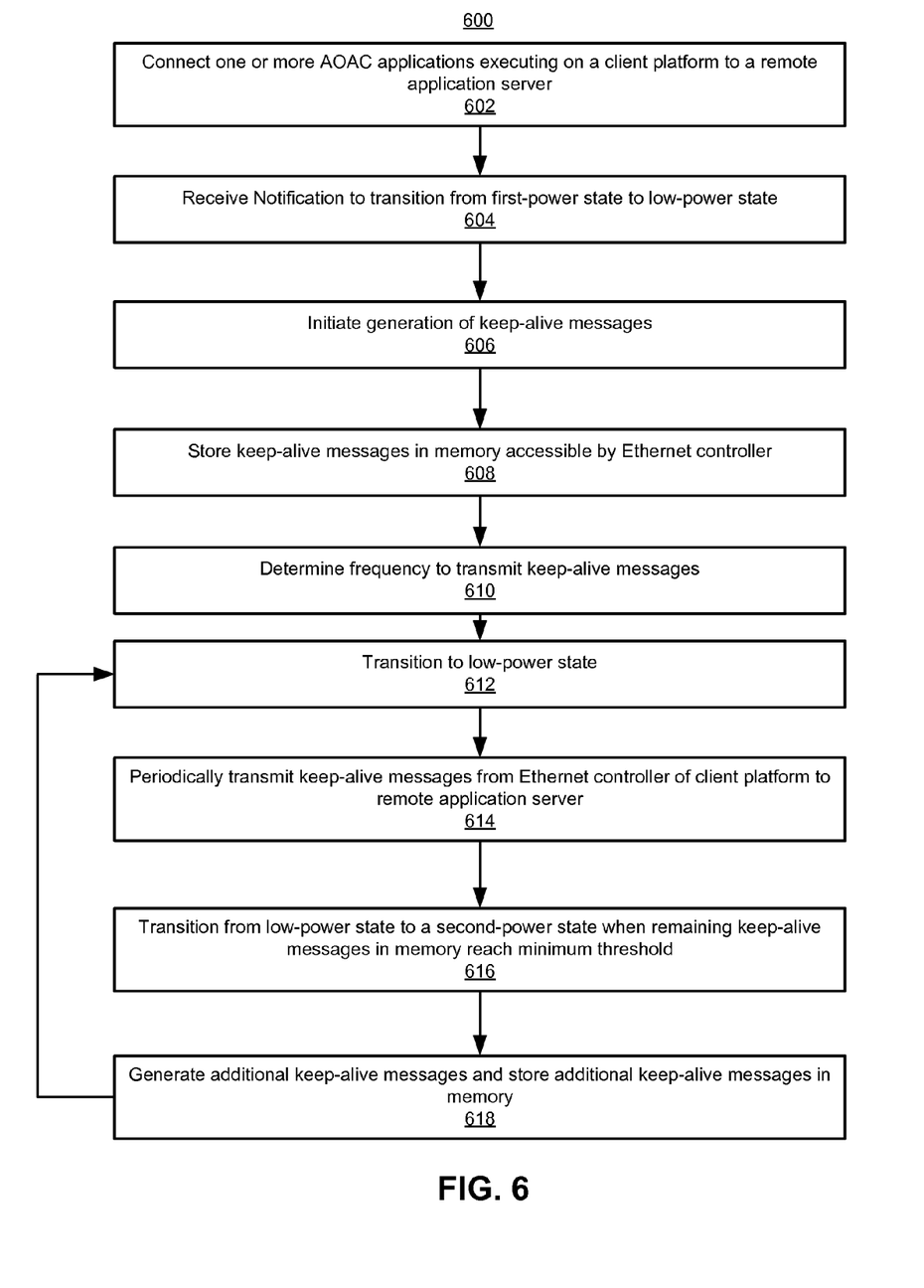
FIG. 6 illustrates one embodiment of a flowchart of operations consistent with the present disclosure.

Turning now to FIG. 6, one embodiment illustrating a flowchart 600 of operations to establish and/or maintain connectivity and presence with a remote application server is provided. For example, one or more AOAC applications executing on the client platform are connected to a remote application server (operation 602). The client platform is operating in a first-power state (e.g., an active-power state). The client platform then receives a notification to transition from the first-power state to a low-power state (operation 604). The notification may be user-generated (e.g., closing the lid on a laptop or activating a low-power state function) and/or automatic (e.g., the client platform may automatically transition to the low-power state after a predetermined period of inactivity). Prior to transitioning to the low-power state, the client platform initiates the generation of the keep-alive messages (operation 606). The keep-alive messages may be generated prior to, or after, notification to transition to the low-power state. As described herein, the entire keep-alive messages may be generated (e.g., the completely pre-built keep-alive messages) or a portion of the keep-alive messages may be generated (e.g., a general keep-alive message and a list of security tokens). The keep-alive messages (or portions thereof) may be stored in memory which is accessible to the NIC while the client platform is in the low-power state (operation 608). Optionally, the client platform determines the frequency to transmit the keep-alive messages, for example, when multiple AOAC applications are executing on the client platform (operation 610).

The client platform may then transition to the low-power state (operation 612). Once the client platform in operating in the low-power state, the NIC may begin periodically transmitting the keep-alive messages to the remote application server (operation 614). The NIC may continue to transmit the keep-alive messages until the client platform transition from the low-power state (e.g., due to a packet received by the NIC or a user-initiated transition). Alternatively, the NIC may continue to transmit the keep-alive messages until the remaining number of keep-alive messages stored in the memory reaches a minimum threshold. Once the minimum threshold has been reached, the client platform transitions from the low-power state to a second-power state (operation 616). The client platform then initiates generating additional keep-alive messages and stores them in the memory (operation 618). The second-power state may be the active-power state or an intermediary power state sufficient to allow the client platform to generate additional keep-alive messages. The minimum threshold may be selected to allow the client platform sufficient time to generate additional keep-alive messages while still maintaining connectivity and presence with the remote application server. After the additional keep-alive messages have been generated/stored, the client platform transitions back to the low-power state (operation 612) and resumes periodically transmitting the keep-alive messages as described herein.

Figure 7:
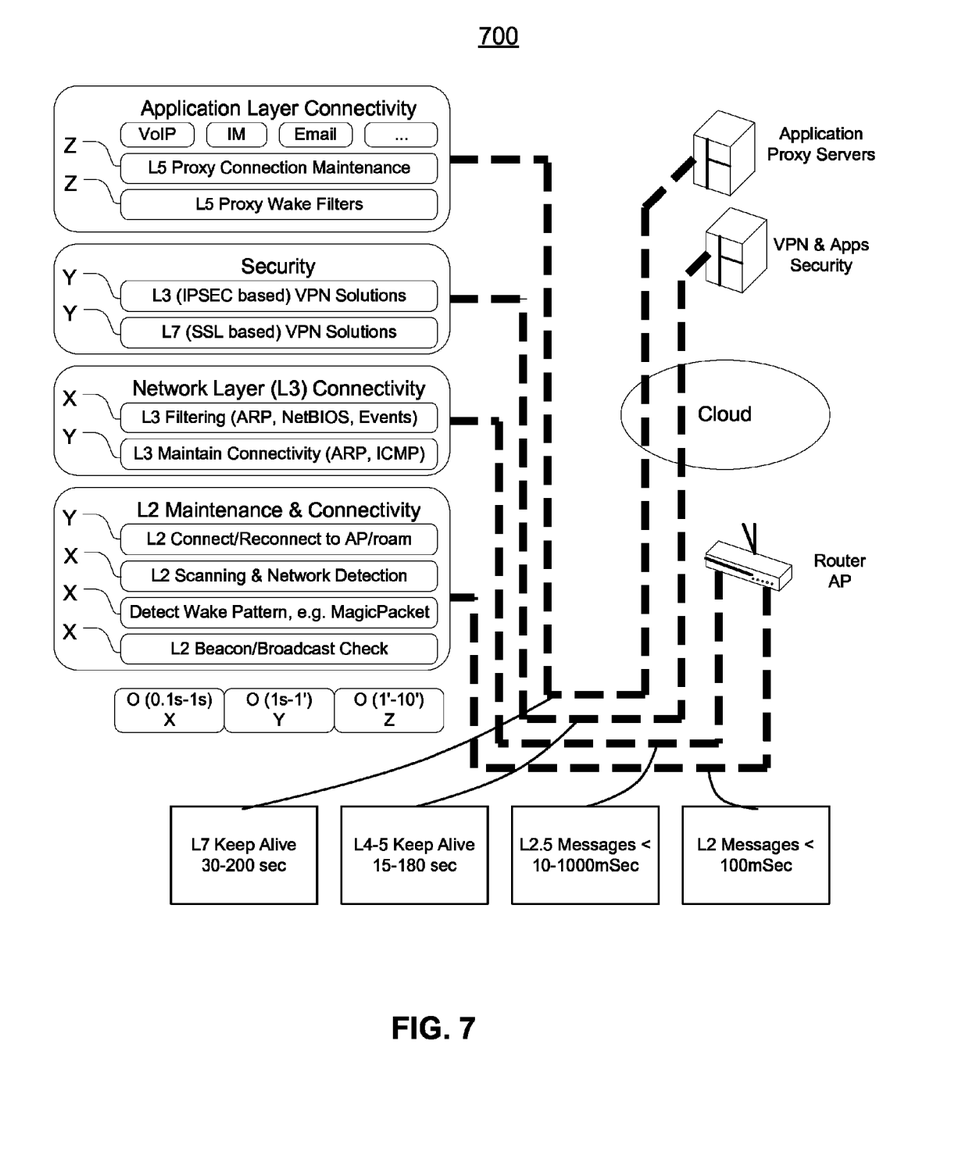
FIG. 7 illustrates one embodiment of the various stack layers.

As explained herein, the client platform 102, FIG. 1, may maintain connectivity and presence to the network 104 and one or more remote application servers 106 when the client platform 102 is in a low-power state by periodically transmitting keep-alive messages to the appropriate address (e.g., the application server 106). As discussed herein, the keep-alive messages may be generated based on a respective application/service proprietary protocol, sequence number, timing information, and/or application/service key or token. To operate in accordance with the protocols and/or standards described herein, the keep-alive messages may implement some of the communication system layers. FIG. 7 illustrates at a high level a keep-alive message 700 and its associated frequency of the various layers of a network stack. For example, the keep-alive message 700 consistent with at least one embodiment of the present disclosure may target the data/link layer message (such as, but not limited to, 802.11 MAC layer (i.e., OSI Data/Link Layer 2)) and applications/services layer messages (such as, but not limited to, OSI Session Layer 5, OSI Presentation layer 6, and OSI Application Layer 7)); however, it should be understood that a keep-alive message consistent with the present disclosure is also applicable to messages at any layer.

The Data/Link Layer 2 provides the functional and procedural means to transfer data between network entities and to detect and possibly correct errors that may occur in the Physical Layer. The Session Layer 5 controls the dialogues (connections) between computers. It establishes, manages and terminates the connections between the local and remote application. It provides for full-duplex, half-duplex, or simplex operation, and establishes checkpointing, adjournment, termination, and restart procedures. The Session Layer is commonly implemented explicitly in application environments that use remote procedure calls in which the client platform 102 sends a request message to a known remote application server 106 to execute a specified procedure with supplied parameters. The remote application server 106 sends a response to the client platform 102, and the application continues its process. The Presentation Layer 6 establishes context between Application Layer entities, in which the higher-layer entities may use different syntax and semantics if the presentation service provides a mapping between them. If a mapping is available, presentation service data units are encapsulated into session protocol data units, and passed down the stack. The Presentation Layer 6 provides independence from data representation (e.g., encryption) by translating between application and network formats. The Application Layer 7 interacts with software applications that implement a communicating component. Application Layer 7 functions may include identifying communication partners, determining resource availability, and synchronizing communication.

NIC 220 may also include I/O link or bus circuitry (not shown) to provide I/O communications between the NIC 220 and the chipset circuitry 206 (such link or bus circuitry may comply with the aforementioned PCI-Express communications protocol). NIC may also include MAC/PHY interface circuitry (not shown) configured to provide I/O communications between the MAC circuitry 220 and the PHY circuitry 224 (which may include, for example SGMII or XAUI).

Memory 208 and/or memory 274 associated with the NIC 220 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 208 and/or memory 274 associated with the NIC 220 may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The wireless and/or wired communications protocol (e.g., but not limited to, an Ethernet protocol), described herein, may be capable permitting communication using a Transmission Control Protocol/Internet Protocol (TCP/IP). The wireless and/or wired protocol may comply or be compatible with the Ethernet standard published by the Institute of Electrical and Electronics Engineers (IEEE) titled "IEEE 802.3 Standard", published in March, 2002 and/or later versions of this standard (such as, but not limited to, the "IEEE 802.11 Standard").

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 and/or 802.11 communications protocols, and/or PHY circuitry that is compliant with an after-developed communications protocol.

Examples of Messaging Used to Maintain Connectivity

In one embodiment, energy may be conserved during platform operation by keeping only essential subsystems active, and then only fully energizing the entire platform when necessary. For example, while the functionality provided by AOAC applications is based on the capability to receive information at any time, this capability does not imply that information is constantly being received. On the contrary, the amount of incoming information may sometimes be low or nonexistent (e.g., late night, weekends, holidays, etc.). Therefore, what becomes significant for supporting AOAC applications in an energy-efficient manner is maintaining some connectivity to the information providers so that, on the occasion that information is pending, the necessary systems in the platform may be activated to receive/process the information. In order to maintain this connectivity, messages (e.g., packets) may be exchanged between NIC 220 and a remote resource (e.g., at least one remote application server 106) when client platform 200 transitions to a low-power state. The messages create traffic that keeps the "flow" alive for maintaining connectivity with AOAC applications/services on remote application server 106. When the message traffic stops, a firewall or network address translator (NAT) may only maintain the state of the flow for a short timeout. If no new packets belonging to the flow are detected within the timeout period the flow state will be dropped. Client platform 200 will then be required to reset the cycle and reinitiate the connection for further interaction with remote application server 106.

Dropping the flow typically severs all connectivity with remote application server 106. In particular, even if remote application server 106 had information to send to client platform 200, there is no way for remote application server 106 to initiate a connection since connection requests initiated from outside of a firewall or NAT are usually blocked (e.g., to prevent denial-of-service (DOS) attacks). Therefore, a continuous stream of "keep-alive" messages transmitted from the inside-out (e.g., from client platform 200 to remote application server 106) may serve to maintain the flow and also connectivity to applications/services. The interval at which messages are transmitted varies depending on the application (e.g., example transmission periods may range from tens of seconds to minutes). In one embodiment the messages may be simple so that they may be transmitted by NIC 220 after client platform 200 transitions to the low-power mode, should be based on existing communication protocols so as to avoid having to implement special procedures and/or functionality, and should be secure to provide integrity and authenticity in the communication (e.g., the origin of a received message should be verifiable to avoid DOS attacks on remote application server 106 and/or unnecessarily causing client platform 200 to transition from the low power state to an active state). Message transmission may continue until a situation occurs that NIC 220 is not able to handle. For example, NIC 220 may cause client platform 200 to become active if it is no longer able to transmit messages, it determines that a problem exists, or it receives a message indicating that remote application server 106 has information for client platform 200. By operating in this manner, client platform 200 may become fully energized only on an as-needed basis, and thus, power expenditures in client platform 200 may be minimized.

Figure 8:
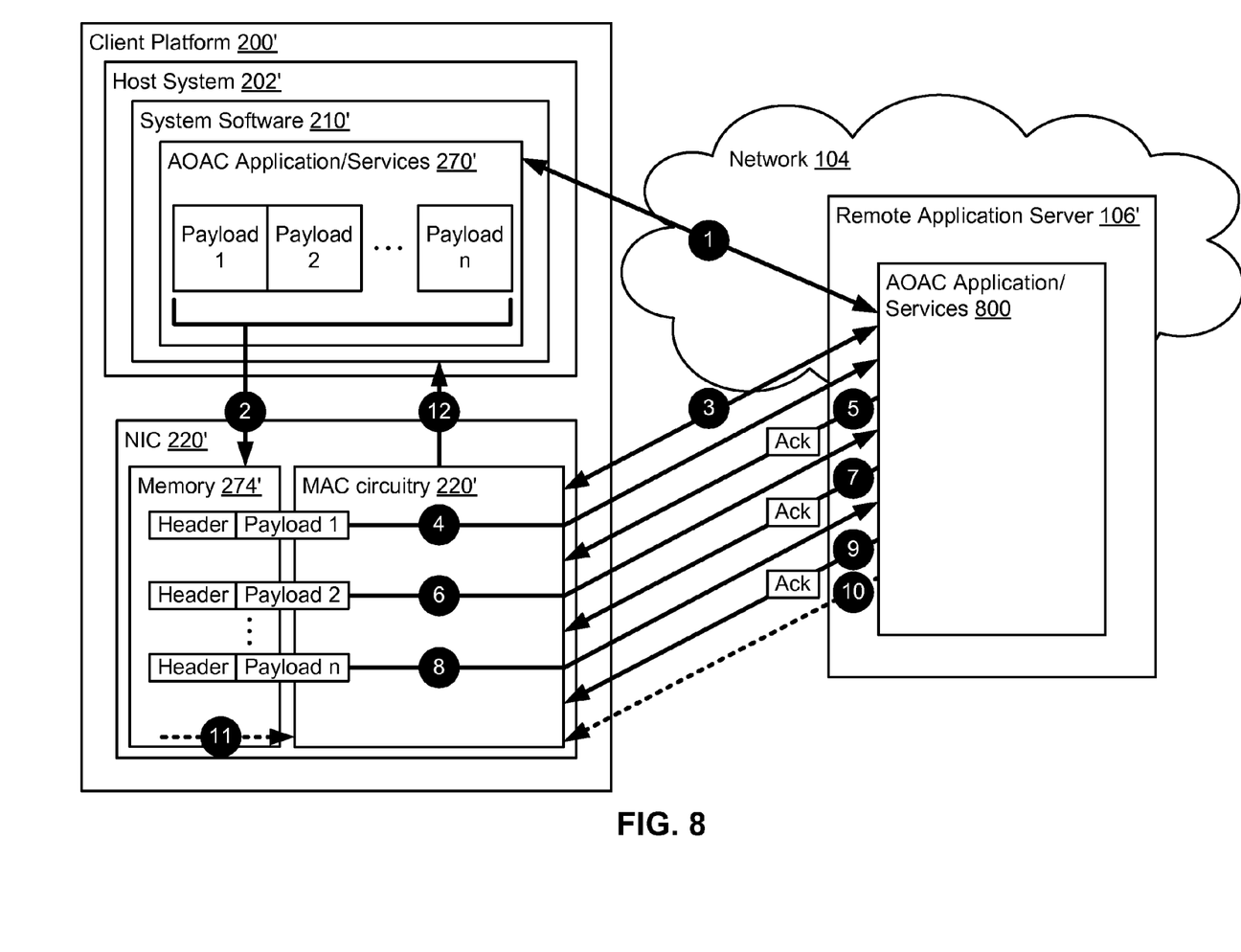
FIG. 8 illustrates an example message exchange usable for maintaining connectivity in accordance with at least one embodiment.

FIG. 8 illustrates an example message exchange usable for maintaining connectivity in accordance with at least one embodiment. Client platform 200' may include at least host system 202' and NIC 220'. Host system 202' may include system software 210' in which AOAC application/services 270' may reside. NIC 220' may include MAC circuitry 220' and Memory 274'. Additional features, such as those illustrated in FIG. 2 with respect to client platform 200, may also be included in client platform 200' but have been omitted from FIG. 8 for the sake of clarity. Moreover, while memory 274' is disclosed in FIG. 8 within NIC 220', the placement of memory 274' is not limited to this configuration. The disclosed location is merely to represent that memory 220' is accessible to NIC 220' even if host system 202' enters a low-power state.

In the two-way interaction labeled "1" in FIG. 8, AOAC application/services 270' may interact with AOAC application/services 800 residing on remote application server 106'. For example, AOAC application/services 270' may register with AOAC application/services 800. Registration may include, for example, alerting AOAC application/services 800 that AOAC application/services 270' exists in client platform 200' and further exchanging any configuration information required for AOAC operations. In one embodiment the exchange of configuration information may include exchanging keys in order to establish a shared private key in both client platform 200' and remote application server 106'. AOAC application/services 270' may use the shared private key to encrypt a series of payloads (e.g., payload 1, payload 2 . . . payload n). In one embodiment, payloads may include information, for example, from AOAC applications 302(1) to 302(n) as disclosed in FIG. 3. In addition, since the encryption may be based on the packet's placement in a sequence of payloads generated by AOAC application/services 270', encrypted payloads containing the same or similar information may not be identical.

As shown at "2", encrypted payloads 1 . . . n may be transferred to memory 274' when client platform 200' transitions to a low-power state. For example, detecting that client platform 200' is transitioning to a low-power state may cause AOAC Application/Services 270' to load encrypted payloads 1 . . . n into a firmware image that NIC 220' will utilize while client platform 200' is the low-power state. NIC 220' may then initiate operations to maintain connectivity with remote application server 106'. In one embodiment NIC 220' may initiate a new TCP connection to the Internet server Hyper-Text Transfer Protocol (http) port (e.g., port 80). In accordance with TCP connection establishment, a "3-way TCP handshake" may occur to initiate a connection as shown at "3" in FIG. 8. For example, client platform 200' may perform an active open by transmitting a SYN message to remote application server 106'. The SYN message sets a segment sequence number to a random value (e.g., A). Remote application server 106' then replies with a SYN-ACK message. In the SYN-ACK message the acknowledgment number is set to one more than the received sequence number (e.g., A+1), and a sequence number that the server chooses for the packet is set to another random number (e.g., B). Client Platform 100' then sends an ACK message back to the server. The sequence number is set to the received acknowledgement value (A+1), and the acknowledgement number is set to one more than the received sequence number (B+1). A TCP connection is then established. Advantages may be realized by utilizing existing TCP protocols. Special operations and/or functionality are not needed since TCP protocols have wide ecosystem support in the applications area, making implementation of AOAC functionality easier across different platforms. Further, Since HTTP/TCP connections are recognized as legitimate inside-out connections, it is less likely that a firewall/NAT will block the connection.

NIC 220' may then begin transmitting "keep-alive" packets as shown at "4" in FIG. 8. In one embodiment the packets may be formatted as http POST messages. Http POST messages may be configured to submit data to be processed (e.g., from an HTML form) to an identified resource (e.g., remote application server 106'). The payload of the packet transmitted at "4" is encrypted payload 1. After receiving a packet, remote application server 800 (possibly in conjunction with AOAC application/services 800) may decrypt the packet. If the packet is determined to be correct then an Ack (acknowledgement) packet is transmitted back to NIC 220' as shown at "5". Similarly, a packet containing payload 2 may be transmitted as shown at "6", with an acknowledgement being received as shown at "7", and a packet containing payload n may be transmitted as shown at "8" with an acknowledgement being received as shown at "9".

The example message exchanges described above assume that every transmitted packet is received successfully. However, in practice there may be instances when acknowledgements are not received. For example, client platform 200' may go out of network (e.g., may lose network connectivity due to going outside of wireless communication range, being disconnected from a hardware connection, etc.). In one embodiment NIC 220' may maintain a window of one packet. A one-packet window allows NIC 220' to operate simply in that a complete TCP stack offload is not needed to handle the sizing of the TCP congestion window or any of the optional flags in the TCP header. Operating in this manner, NIC 220' may continue to retransmit a packet including an encrypted payload until receipt of the packet is acknowledged by remote application server 106' or a retransmission limit is met. The retransmission limit may simply be a predetermined number of attempts to transmit a packet. If the retransmission limit is met, NIC 220' may cause client platform 200' to transition from a low-power state to an active power state. Causing client platform 200' to transition may include NIC 220' setting a wakeup bit monitored by host system 202, sending a wakeup signal to host system 202 as shown at "12" in FIG. 8, etc. Upon waking, client platform 200' may address the situation. For example, if network connectivity has been lost, client platform 200' may suspend AOAC operation until reconnected to network 104. In one embodiment, NIC 220' may cause client platform 200' to transition from a low-power state to an active power state whenever there is any unexpected situation during AOAC operations. Unexpected situations may include, but are not limited to, remote application server 106' not being able to decrypt a packet payload and/or not accepting the payload in a packet (e.g., due to the packet arriving out of sequence because the previous packet was dropped), the active TCP connection to remote application server 106' being severed, delays due to high packet traffic, etc.

NIC 220' may also cause platform 200' to transition from a low-power state to an active power state based on expected situations. Two example events are shown at "10" and "11" in FIG. 8. At "10" a wakeup message is transmitted to NIC 220' from remote application server 106'. The wakeup message may be transmitted if, for example, remote application server 106' has information pending for an AOAC application (e.g., 302(1) to 302(n) in FIG. 3) in client platform 200'. For example, an email pending in remote application server 106' for delivery to an email application in client platform 200' may cause a wakeup signal to be transmitted. After receiving the wakeup signal at "10", NIC 220' may cause client platform 200' to transition from a low-power state to an active power state at "12" to receive the information (e.g., to receive the email into the email application). It may also be possible for NIC 220' to successfully transmit all of the payloads in memory 274' during normal AOAC operations. At "11" in FIG. 8 NIC 220' may become aware that there are no further payloads to transmit, and may cause platform 200' to transition from a low-power state to an active power state as shown at "12" in order to generate/encrypt more payloads. In one embodiment, client platform 200' may again interact with remote applications server 106' to generate a new shared private key for use in encrypting more payloads, may generate new encrypted payloads using the new key, and may then return to the low-power state. AOAC operations (e.g., encrypted payload transmission) may then resume.

Figure 9:
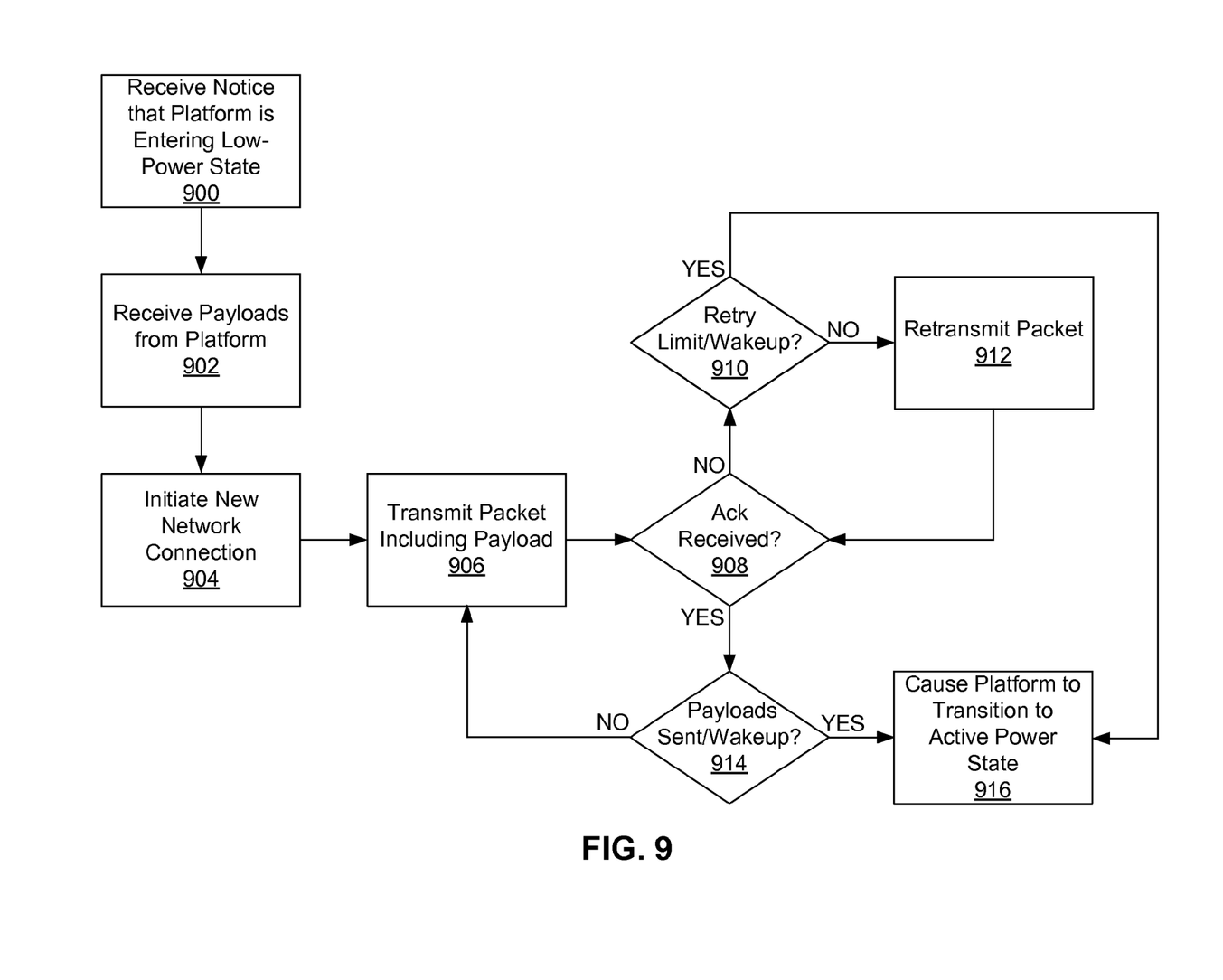
FIG. 9 illustrates a flowchart of example operations for maintaining connectivity in accordance with at least one embodiment.

FIG. 9 illustrates a flowchart of example operations for maintaining connectivity, from the perspective of a NIC in a client platform, in accordance with at least one embodiment. In operation 900 notification may be received in the NIC that the client platform is transitioning to a low-power state. Payloads may then be received in the NIC from the client platform in operation 902. For example, AOAC applications/services in the client platform, upon determining that the client platform is about to enter a low-power state, may write the payloads into a memory that is accessible to the NIC (e.g., firmware of the NIC). In one embodiment the received payloads may be encrypted. In operation 904 the NIC may initiate a new network connection (e.g., a TCP connection) to a remote application server. A packet including one of the received payloads may then be transmitted to the remote application server in operation 906. A determination may then be made in operation 908 as to whether receipt of the packet was acknowledged by the remote application server (e.g., was a packet received including an acknowledgement corresponding to the transmitted packet). If it is determined in operation 908 that no acknowledgement has been received, then in operation 910 a further determination may be made as to whether the NIC has reached a retry limit for transmitted the packet, or alternatively, if another wakeup situation has occurred prompting the NIC to cause the client platform to transition from a low-power state to an active power state. Other wakeup situations may include, but are not limited to, a problem (e.g., unexpected behavior) being observed by the NIC, a wakeup packet being received in the NIC from the remote application server, etc. If it is determined in operation 910 that the retry limit has not been reached, and no other situation exists that would prompt the NIC to cause the client platform to power up, then in operation 912 the packet may be transmitted, followed by a return to operation 908 to await an acknowledgement. If in operation 910 it is determined that the retry limit has been reached or a wakeup situation exists, then in operation 916 the NIC may cause the client platform to transition from a low-power state to an active power state. Once in the active power state, the client platform may execute measures to handle any problems that exist.

Returning to operation 908, if it is determined that an acknowledgement corresponding to the transmitted packet has been received, then in operation 914 a determination may be made as to whether all of the payloads in memory have been sent, or alternatively, if a wakeup situation has occurred prompting the NIC to cause the client platform to transition from a low power state to an active power state. If not all of the payloads have been transmitted then in operation 906 the next payload (e.g., the next payload in sequence if encrypted) may be transmitted. If it is determined in operation 914 that all payloads have been transmitted or that a wakeup situation exists, then in operation 916 the NIC may cause the client platform to transition from a low-power state to an active power state. Once in the active power state, the client platform may generate/encrypt additional payloads or execute measures to handle any problems that exist.

While FIGS. 6 and 9 illustrate various operations according to several embodiments, it is to be understood that not all of the operations depicted in FIGS. 6 and 9 are necessary for other embodiments. Indeed, it is fully contemplated herein that in other embodiments of the present disclosure, the operations depicted in FIGS. 6 and 9 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Thus, the present disclosure provides methods and systems for maintaining connectivity between a client platform and a remote resource (e.g., at least one remote application server) after the client platform transitions to a low power state. A NIC in the client platform may receive notification that the client platform is transitioning to a low power state and one or more payloads that may be encrypted. To maintain connectivity between the client platform and the remote application server, the NIC may transmit packets including the payloads. If no acknowledgement is received from the remote application server, or if another situation occurs that requires participation from the client platform, the NIC may cause the client platform to transition from the low-power state to an active power state. Otherwise, the NIC may transmit packets/receive acknowledgements until no payloads remain, in which case the NIC may cause the client platform to transition from the low-power state to an active power state in order to generate/encrypt additional payloads.

According to one aspect there is provided a system. The system may include communication circuitry configured to transmit and receive packets and one or more storage mediums. In addition, the one or more storage mediums having stored thereon, individually or in combination, instructions that when executed by one or more processors result in the following operations comprising receiving notification that a platform is transitioning to a low-power state, receiving at least one payload from the platform, the at least one payload being configured to maintain connectivity with a remote resource while the platform is in the low-power state, transmitting a packet including the at least one payload and receiving a packet including an acknowledgement.

The above system may be further configured, wherein the remote resource comprises at least one remote application server accessible via the Internet.

The above system may be further configured, wherein the at least one payload is encrypted based on a key established between the platform and the remote resource.

The above system may be further configured, wherein the instructions that when executed by one or more processors result in additional operations comprising initiating a Transmission Control Protocol (TCP) connection to the remote resource prior to transmitting the packet including the at least one payload.

The above system may be further configured, wherein the instructions that when executed by one or more processors result in additional operations comprising retransmitting the packet including the at least one payload until the packet including the acknowledgement is received or until a retransmission limit is reached. In this example configuration, the instructions that when executed by one or more processors result in additional operations including causing the platform to transition from the low-power state to an active power state based on the retransmission limit being reached.

The above system may be further configured, wherein the at least one payload comprises a plurality of payloads and transmitting a packet including the at least one payload comprises transmitting packets each including one of the plurality of payloads. In this example configuration, the instructions that when executed by one or more processors result in additional operations including causing the platform to transition from the low-power state to an active power state based on transmitting all of the packets each including one of the plurality of payloads.

The above system may be further configured, wherein the instructions that when executed by one or more processors result in additional operations comprising causing the platform to transition from the low-power state to an active power state based on a packet received from the remote resource. In this example configuration, the above system may be further configured wherein the packet received from the remote resource indicates that the remote resource has information pending for the platform.

According to another aspect there is provided a system. The system may include one or more storage mediums having stored thereon, individually or in combination, instructions that when executed by one or more processors result in the following operations comprising receiving notification that a platform is transitioning to a low-power state, receiving at least one payload from the platform, the at least one payload being configured to maintain connectivity with a remote resource while the platform is in the low-power state, transmitting a packet including the at least one payload and receiving a packet including an acknowledgement.

The above system may be further configured, wherein the remote resource comprises at least one remote application server accessible via the Internet.

The above system may be further configured, wherein the at least one payload is encrypted based on a key established between the platform and the remote resource.

The above system may be further configured, wherein the instructions that when executed by one or more processors result in additional operations comprising initiating a Transmission Control Protocol (TCP) connection to the remote resource prior to transmitting the packet including the at least one payload.

The above system may be further configured, wherein the instructions that when executed by one or more processors result in additional operations comprising retransmitting the packet including the at least one payload until the packet including the acknowledgement is received or until a retransmission limit is reached. In this example configuration, the instructions that when executed by one or more processors result in additional operations including causing the platform to transition from the low-power state to an active power state based on the retransmission limit being reached.

The above system may be further configured, wherein the at least one payload comprises a plurality of payloads and transmitting a packet including the at least one payload comprises transmitting packets each including one of the plurality of payloads. In this example configuration, the instructions that when executed by one or more processors result in additional operations including causing the platform to transition from the low-power state to an active power state based on transmitting all of the packets each including one of the plurality of payloads.

The above system may be further configured, wherein the instructions that when executed by one or more processors result in additional operations comprising causing the platform to transition from the low-power state to an active power state based on a packet received from the remote resource. In this example configuration, the above system may be further configured wherein the packet received from the remote resource indicates that the remote resource has information pending for the platform.

According to another aspect there is provided a method. The method may include receiving notification that a platform is transitioning to a low-power state, receiving at least one payload from the platform, the at least one payload being configured to maintain connectivity with a remote resource while the platform is in the low-power state, transmitting a packet including the at least one payload and receiving a packet including an acknowledgement.

The above method may be further configured, wherein the remote resource comprises at least one remote application server accessible via the Internet.

The above method may be further configured, wherein the at least one payload is encrypted based on a key established between the platform and the remote resource.

The above method may further comprise initiating a Transmission Control Protocol (TCP) connection to the remote resource prior to transmitting the packet including the at least one payload.

The above method may further comprise retransmitting the packet including the at least one payload until the packet including the acknowledgement is received or until a retransmission limit is reached. For example, this method may further comprise causing the platform to transition from the low-power state to an active power state based on the retransmission limit being reached.

The above method may be further configured, wherein the at least one payload comprises a plurality of payloads and transmitting a packet including the at least one payload comprises transmitting packets each including one of the plurality of payloads. For example, this method may further comprise causing the platform to transition from the low-power state to an active power state based on transmitting all of the packets each including one of the plurality of payloads.

The above method may further comprise causing the platform to transition from the low-power state to an active power state based on a packet received from the remote resource. For example this method may be further configured, wherein the packet received from the remote resource indicates that the remote resource has information pending for the platform.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system, comprising:
   communication circuitry configured to transmit and receive packets while a platform is in a low-power state; and
   one or more non-transitory storage mediums having stored thereon, individually or in combination, instructions that when executed by one or more processors result in the following operations comprising:
   receiving notification that the platform is transitioning to the low-power state;
   receiving a plurality of payloads from the platform, the payloads being configured to maintain connectivity with a remote resource while the platform is in the low-power state;
   transmitting packets each including one of the plurality of payloads;
   receiving a packet including an acknowledgement; and
   causing the platform to transition from the low-power state to an active power state based on transmitting all of the packets each including one of the plurality of payloads.

2. The system of claim 1, wherein the at least one payload is encrypted based on a key established between the platform and the remote resource.

3. The system of claim 1, wherein the instructions that when executed by one or more processors result in the following additional operations:
   retransmitting the packet including the at least one payload until the packet including the acknowledgement is received or until a retransmission limit is reached.

4. The system of claim 3, wherein the instructions that when executed by one or more processors result in the following additional operations:
   causing the platform to transition from the low-power state to an active power state based on the retransmission limit being reached.

5. The system of claim 1, wherein the instructions that when executed by one or more processors result in the following additional operations:
   causing the platform to transition from the low-power state to an active power state based on a packet received from the remote resource.

6. A system, comprising one or more non-transitory storage mediums having stored thereon, individually or in combination, instructions that when executed by one or more processors result in the following operations comprising:
   receiving notification that a platform is transitioning to a low-power state;
   receiving a plurality of payloads from the platform, the payloads being configured to maintain connectivity with a remote resource while the platform is in the low-power state;
   transmitting packets each including one of the plurality of payloads;
   receiving a packet including an acknowledgement; and
   causing the platform to transition from the low-power state to an active power state based on transmitting all of the packets each including one of the plurality of payloads.

7. The system of claim 6, wherein the at least one payload is encrypted based on a key established between the platform and the remote resource.

8. The system of claim 6, wherein the instructions that when executed by one or more processors result in the following additional operations:
   retransmitting the packet including the at least one payload until the packet including the acknowledgement is received or until a retransmission limit is reached.

9. The system of claim 8, wherein the instructions that when executed by one or more processors result in the following additional operations:
   causing the platform to transition from the low-power state to an active power state based on the retransmission limit being reached.

10. The system of claim 6, wherein the instructions that when executed by one or more processors result in the following additional operations:
    causing the platform to transition from the low-power state to an active power state based on a packet received from the remote resource.

11. A method, comprising:
receiving notification that a platform is transitioning to a low-power state;
receiving a plurality of payloads from the platform, the payloads being configured to maintain connectivity with a remote resource while the platform is in the low-power state;
transmitting packets each including one of the plurality of payloads;
receiving a packet including an acknowledgement; and
causing the platform to transition from the low-power state to an active power state based on transmitting all of the packets each including one of the plurality of payloads.

12. The method of claim 11, further comprising:
retransmitting the packet including the at least one payload until the packet including the acknowledgement is received or until a retransmission limit is reached.

13. The method of claim 12, further comprising:
causing the platform to transition from the low-power state to an active power state based on the retransmission limit being reached.

14. The method of claim 11, further comprising:
causing the platform to transition from the low-power state to an active power state based on a packet received from the remote resource.

* * * * *